(12) United States Patent
Ciccarelli et al.

(10) Patent No.: US 11,908,346 B2
(45) Date of Patent: Feb. 20, 2024

(54) SYSTEM AND METHOD FOR EVALUATING THE TRAINING OF AN OPERATOR IN A TRAINING MISSION IN REAL TIME

(71) Applicant: LEONARDO S.P.A., Rome (IT)

(72) Inventors: Roberto Ciccarelli, Sangano (IT); Emanuele Rovea, Olgiate Olona (IT); Francesco Ollosu, Cuveglio (IT); Paolo Rigato, Rome (IT)

(73) Assignee: LEONARDO S.P.A., Rome (IT)

( * ) Notice: Subject to any disclaimer, the term of this patent is extended or adjusted under 35 U.S.C. 154(b) by 40 days.

(21) Appl. No.: 17/761,062

(22) PCT Filed: Sep. 18, 2020

(86) PCT No.: PCT/IB2020/058729
§ 371 (c)(1),
(2) Date: Mar. 16, 2022

(87) PCT Pub. No.: WO2021/053612
PCT Pub. Date: Mar. 25, 2021

(65) Prior Publication Data
US 2022/0343787 A1    Oct. 27, 2022

(30) Foreign Application Priority Data
Sep. 20, 2019  (IT) .......................... 102019000016859

(51) Int. Cl.
*G09B 9/24*    (2006.01)
(52) U.S. Cl.
CPC ..................................... *G09B 9/24* (2013.01)

(58) Field of Classification Search
CPC ........................................................ G09B 9/24
See application file for complete search history.

(56) References Cited

U.S. PATENT DOCUMENTS

| | | | | |
|---|---|---|---|---|
| 5,260,874 A | * | 11/1993 | Berner ..................... | G09B 9/24 434/242 |
| 7,131,136 B2 | * | 10/2006 | Monroe ................. | H04N 7/181 348/E7.086 |
| 8,170,976 B2 | * | 5/2012 | Dargue .................... | G09B 9/08 706/47 |

(Continued)

OTHER PUBLICATIONS

International Search Report and Written Opinion in PCT Application No. PCT/IB2020/058729, dated Apr. 8, 2021.

*Primary Examiner* — Xuan M Thai
*Assistant Examiner* — Sadaruz Zaman
(74) *Attorney, Agent, or Firm* — Leason Ellis LLP

(57) ABSTRACT

A system for evaluating an operator in a training mission on a training element, including a first processing unit configured to receive and process first data to generate converted data according to an operating frequency; a second processing unit configured to receive and process the converted data and mission support data according to the operating frequency to generate second data; and a third processing unit configured to receive and compare the converted data with the second data according to the operating frequency such to generate, based on said comparison, response data. Response data comprise visualisation data and the evaluation system further includes a graphic process unit configured to receive visualisation data and generate a map of the operating environment wherein the training element operates.

10 Claims, 9 Drawing Sheets

(56) References Cited

U.S. PATENT DOCUMENTS

| | | | | |
|---|---|---|---|---|
| 8,864,497 B1* | 10/2014 | Pollak | G09B 9/08 | |
| | | | 434/37 | |
| 9,501,611 B2* | 11/2016 | Jacques | G09B 9/24 | |
| 10,467,923 B2* | 11/2019 | Livneh | G09B 9/24 | |
| 10,885,530 B2* | 1/2021 | Mercury | G06F 30/20 | |
| 10,964,226 B2* | 3/2021 | Wokurka | B60W 50/14 | |
| 11,042,673 B1* | 6/2021 | McLean | G06F 30/20 | |
| 11,043,138 B2* | 6/2021 | Nissen | G09B 9/307 | |
| 11,508,255 B2* | 11/2022 | Bicanic | G06F 3/013 | |
| 11,532,186 B1* | 12/2022 | Wiegman | G07C 5/0808 | |
| 11,558,108 B2* | 1/2023 | Alcorn | H04B 7/18506 | |
| 11,595,521 B2* | 2/2023 | Martino | H04M 3/42357 | |
| 11,611,448 B2* | 3/2023 | Cui | G10L 15/26 | |
| 11,611,624 B2* | 3/2023 | Selvarajan | G08G 5/003 | |
| 11,710,424 B2* | 7/2023 | Rios | A61M 5/31576 | |
| | | | 604/189 | |
| 11,715,387 B2* | 8/2023 | Delisle | G09B 9/048 | |
| | | | 434/32 | |
| 11,730,543 B2* | 8/2023 | Rios | G16H 50/50 | |
| 2004/0095466 A1* | 5/2004 | Galasso | B64D 45/0053 | |
| | | | 701/14 | |
| 2010/0003652 A1* | 1/2010 | Lavie | G09B 9/003 | |
| | | | 434/219 | |
| 2011/0246000 A1* | 10/2011 | Shavit | G08G 5/0026 | |
| | | | 701/14 | |
| 2015/0079545 A1* | 3/2015 | Kurtz | G06F 21/32 | |
| | | | 434/30 | |
| 2017/0294135 A1* | 10/2017 | Lechner | G06T 19/006 | |
| 2017/0316712 A1* | 11/2017 | Kihara | G09B 9/32 | |
| 2018/0247558 A1 | 8/2018 | Livneh | | |
| 2022/0335850 A1* | 10/2022 | Klassen | G09B 9/16 | |
| 2022/0343787 A1* | 10/2022 | Ciccarelli | G09B 9/08 | |
| 2023/0154351 A1* | 5/2023 | Knaplund | G09B 9/302 | |
| | | | 434/44 | |

\* cited by examiner

SYSTEM AND METHOD FOR EVALUATING THE TRAINING OF AN OPERATOR IN A TRAINING MISSION IN REAL TIME

CROSS-REFERENCE TO RELATED APPLICATIONS

This patent application is a U.S. National Phase Application under 35 U.S.C. § 371 of International Patent Application No. PCT/IB2020/058729, filed on Sep. 18, 2020, which claims priority from Italian patent application no. 102019000016859 filed on Sep. 20, 2019, all of which are incorporated by reference, as if expressly set forth in their respective entireties herein.

TECHNICAL FIELD

The present invention relates to a system and a method for evaluating the training of an operator in a training mission in real time. In particular and without any loss of generality, reference will be made to a system and a method adapted to evaluate the performance of a student pilot piloting an aircraft, such as a military aircraft, during a flight training mission, in real time hereinafter.

BACKGROUND ART

As known, the evaluation of the skills acquired by a student pilot in a flight training mission, for example of the tactical-operative type, is made by an instructor who subjectively evaluates the student pilot's actions in a de-briefing step.

Known systems allow to generate an objective evaluation of the student pilot's actions in a flight training mission, overcoming the subjective character of the evaluation expressed by an instructor.

For instance, US patent US 2018/0247558 A1 discloses a system and a method to identify the deviation of the actions of an aircraft operator from a doctrine. In particular, according to the aforesaid method, the manoeuvres performed by the operator are recorded during the flight and later compared with one or more clones, generated by the system based on the doctrine, the latter being provided by a syllabus; thereby, at the end of the mission (in particular, during the de-briefing step), the system processes an objective evaluation of the manoeuvres performed by the operator based on the aforementioned comparison.

However, the aforesaid system and method thereof do not allow to perform an evaluation of the actions of the operator in real time, as the evaluation, though objective, is postponed to the de-briefing step.

DISCLOSURE OF INVENTION

The object of the present invention is to provide a system and a method which overcome the drawbacks of the prior art.

According to the present invention a system and a method are obtained for evaluating the training of an operator, in particular a student pilot, in a training mission, in particular a flight training mission, on a training element, in particular an aircraft, as defined in the attached claims.

BRIEF DESCRIPTION OF THE DRAWINGS

To better understand the present invention preferred embodiments thereof will be now described, for merely exemplary and non-limiting purposes, with reference to the attached drawings, wherein.

BEST MODE FOR CARRYING OUT THE INVENTION

Figure 1A:
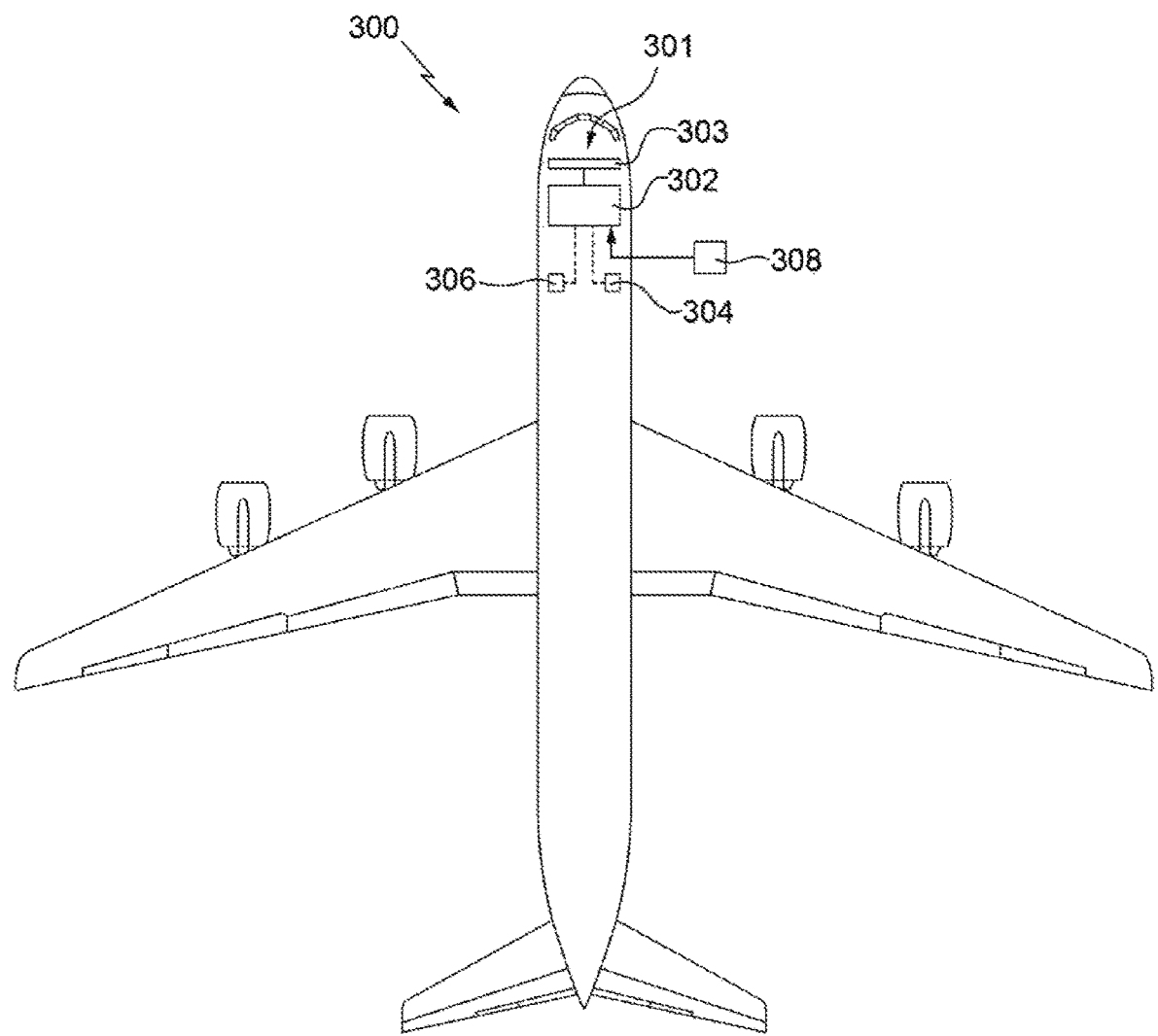
FIG. 1A schematically shows an aircraft to be piloted by a student pilot in a flight training mission.

FIG. 1A schematically shows an aircraft 300, such as a military aircraft, that can be piloted by a student pilot in a flight training mission. In particular, the aircraft 300 comprises a processor 302, housed for instance in a cockpit 301 of the aircraft 300; a screen 303 (in particular, a Human-Machine Interface, HMI), operatively coupled with the processor 302; one or more sensors 304 (one shown in FIG. 1A), such as an altitude sensor or a barometric sensor, operatively coupled with the processor 302; and one or more actuators 306 (one shown in FIG. 1A), such as control actuators available on a HOTAS (Hands On Throttle And Stick) such as the "Trigger Gun" control actuator, operatively coupled with the processor 302.

The processor 302 can be further connected, for example through a LAN ("Local Area Network") port, to an external memory support 308, comprising configuration data $d_{config}$. In particular, the external memory support 308 is configured to transmit configuration data $d_{config}$ to the processor 302, which stores and uses them in the flight training mission according to the modes described hereinafter.

Figure 1B:
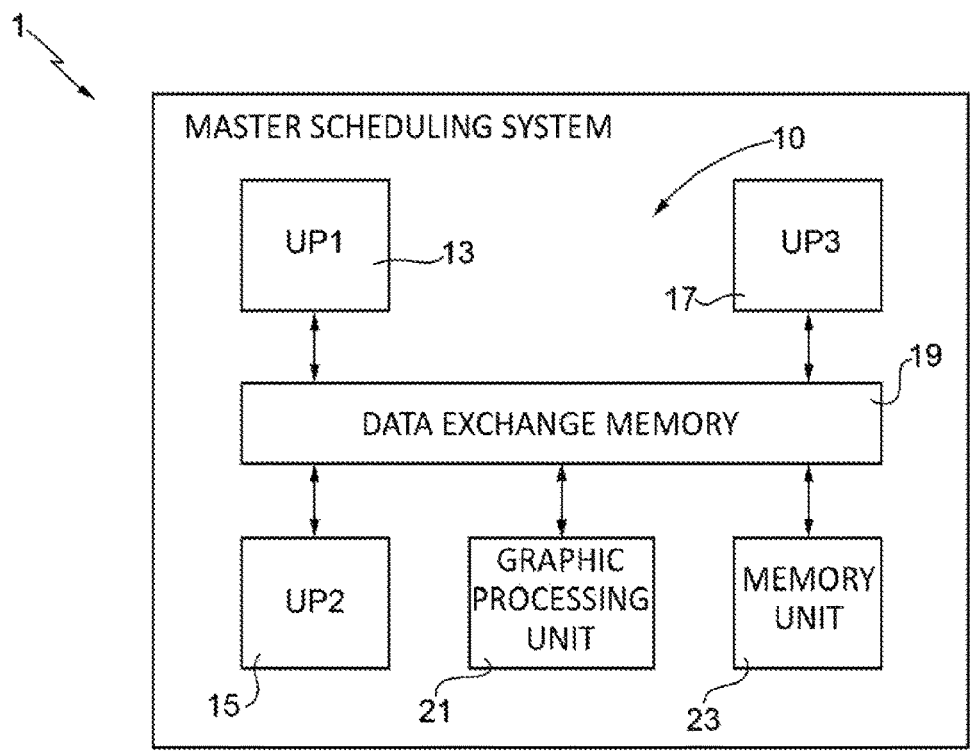
FIG. 1B schematically shows a master scheduling system including the present evaluation system according to an embodiment.

FIG. 1B schematically shows a master scheduling system 1 configured to manage and monitor an evaluation system 10 made according to an embodiment of the present invention and described in greater detail hereinafter; in particular and without any loss of generality, reference will be made hereinafter to an evaluation system 10 housed in the processor 302 of the aircraft 300 of FIG. 1A. In further embodiments of the present invention, the evaluation system 10 is integrated into a simulation processor and, consequently, the aircraft piloted by the student pilot in the flight training mission is a virtual aircraft.

Referring to FIG. 1B, the evaluation system 10 comprises a first, a second and a third processing unit 13, 15, 17 (respectively indicated as UP1, UP2 and UP3 in FIG. 1B), operatively coupled between each other through a data exchange memory 19; in particular, the data exchange memory 19 is configured to store data from the processing units 13, 15, 17, as well as to make data accessible thereto as better described hereinafter.

The evaluation system 10 further comprises a graphic processing unit 21 configured to view data on the screen 303 of the aircraft 300 and based on data generated by the third processing unit 17, stored in the data exchange memory 19, an evaluation of the actions of the student pilot at each step of the flight training mission which the student pilot is submitted; and a memory unit 23, configured to store data generated by the third processing unit 17 and stored in the data exchange memory 19 after each step of the flight training mission.

The master scheduling system 1 is configured to monitor the processing units 13, 15, 17, in particular by recalling the tasks of each processing unit 13, 15, 17 based on a preset operating period t (for instance, of 10 ms) corresponding to a preset operating frequency f (for example, of 10 Hz), as well as to manage the data exchange memory 19 during the different steps of the flight training mission. In other words, the master scheduling system 1 scans the frequency at which each processing unit 13, 15, 17 is required to carry out established operations in each step of the flight training mission.

Figure 2:
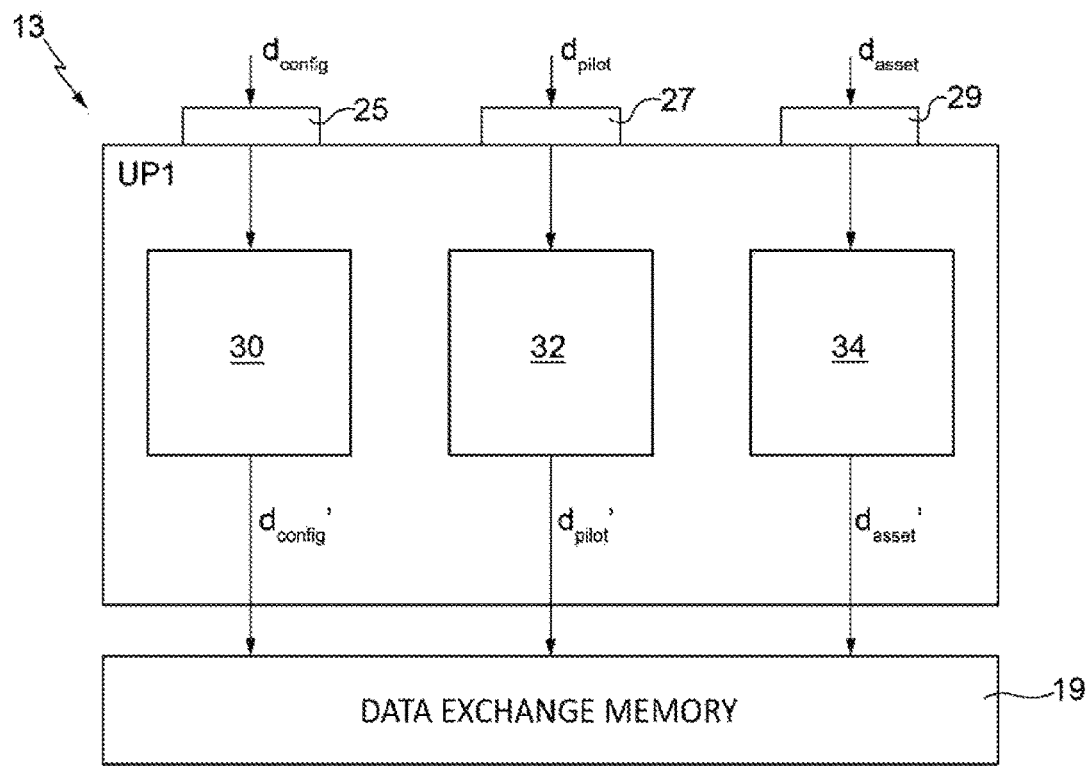
FIG. 2 schematically shows a first processing unit of the evaluation system of FIG. 1B.

FIG. 2 schematically shows the first processing unit 13, which comprises a first, a second and a third interface 25, 27, 29, configured to receive configuration data $d_{config}$, pilot data $d_{pilot}$ and, respectively, training element data $d_{asset}$; and a first, a second and a third operating module 30, 32, 34, operatively coupled with the first, second and, respectively third interface 25, 27, 29, as well as the data exchange memory 19. In greater detail, the operating modules 30, 32, 34 are configured to receive configuration data $d_{config}$, pilot data $d_{pilot}$ and training element data $d_{asset}$ from the respective interfaces 25, 27, 29; furthermore, the operating modules 30, 32, 34 are configured to process configuration data $d_{config}$, pilot data $d_{pilot}$ and training element data $d_{asset}$ to convert them, through known algorithms, into converted configuration data $d_{config}'$, converted pilot data $d_{pilot}'$ and, respectively, converted training element data $d_{asset}'$, having a format that can be used for the evaluation system 10. In addition, the operating modules 30, 32, 34 are configured to transmit the converted configuration data $d_{config}'$, converted pilot data $d_{pilot}'$ and converted training data $d_{asset}'$ to the data exchange memory 19, which temporarily stores them.

In particular, for ease of description, it is considered that the operating modules 30, 32, 34 receive configuration data $d_{config}$, pilot data $d_{pilot}$ and training element data $d_{asset}$, received by the respective interfaces 25, 27, 29, at the same time instant as the aforesaid configuration data $d_{config}$, pilot data $d_{pilot}$ and training element data $d_{asset}$ are received by the aforesaid interfaces 25, 27, 29; in other words, it is considered that there are no delays in the transmission of the aforesaid data among the interfaces 25, 27, 29 and the respective operating modules 30, 32, 34.

Configuration data $d_{config}$, stored in the memory support 308, are determined based on the learning path provided for the student pilot by a training management system (not shown) external to the evaluation system 10. In particular, the external memory support 308 is operatively connected, for example, through dedicated buses, to the first interface 25 of the first processing unit 13, such to transmit configuration data $d_{config}$ thereto.

In greater detail, configuration data $d_{config}$ comprise certificate data $d_{cert}$, which contain information that allow properly encoding and decoding data received and/or generated by the first processing unit 13; and set-up data $d_{set-up}$, which contain information relative to the flight training mission.

In particular, certificate data $d_{cert}$ represent a condition for properly encoding/decoding data received and/or generated by the first processing unit 13; furthermore, the evaluation system 10 uses the certificate data $d_{cert}$ in the of encoding/decoding operations according to the modes disclosed, for example, in the European patent EP 2 670 080 B1.

Furthermore, certificate data $d_{cert}$ are data that must be able to be recognised by the evaluation system 10 (for example, must be in a format recognised by the evaluation system 10 and in a private key); in case certificate data $d_{cert}$ are not recognised, i.e. they are not in a format recognised by the evaluation system 10, the data received and/or generated by the first processing unit 13 cannot be encoded/decoded. For ease of description, it is considered that certificate data $d_{cert}$ are always recognised by the evaluation system 10 hereinafter; therefore, encoding/decoding data received by the first processing unit 13 takes place at any hereinafter described operating step.

Set-up data $d_{set-up}$ comprise syllabus data $d_{syllabus}$, comprising in particular training data or "decision points" $d_{DP}$; aircraft data $d_{vel}$, relative to the aircraft 300; and mission support data $d_{supp,miss}$. In particular, mission support data $d_{supp,miss}$ comprise boundary condition data $d_{bc}$, relative to the spatial extremes (in terms of altitude, longitude and latitude) at which the flight training mission takes place; actor data $d_{att}$, relative to actors (e.g., enemies, allies and neutral) that are present in the flight training mission; and actor type data $d_{att,typ}$, relative to the types of actors present in the flight training mission (e.g., planes, ships and weapons of different types, such as surface air missiles, SAM).

Training data $d_{DP}$ are indicative of the learning thresholds that the student pilot must reach and/or overcome to proceed in the training programme, defined by the training management system based on the skills of the student pilot; for exemplary purposes, training data $d_{DP}$ comprise data relative to the space condition at which the aircraft 300 piloted by the student pilot must operate (e.g. latitude, longitude, altitude and speed) in the time range between the taking-off phase of the aircraft 300 and the conclusive step of the flight training mission. Furthermore, training data $d_{DP}$ are characterized by an entry condition and an exit condition for each step of the flight training mission; in particular, the entry and exit conditions allow to enter or, respectively, exit an entry point and, respectively, an exit point. As better described hereinafter with reference to the third processing unit 17, each step of the flight training mission is comprised between a respective entry point and a respective exit point and represents the step wherein the student pilot is required to perform a number of manoeuvres (i.e., the pilot data $d_{pilot}$ and the training element data $d_{asset}$ are provided to the evaluation system 10) and wherein, once performed, the correctness of the above mentioned manoeuvres is verified with respect to the thresholds imposed by the training data $d_{DP}$. In other words, training data $d_{DP}$ define a set of space-time data, which fulfils the boundary conditions defined by boundary condition data $d_{bc}$ and which is used as comparison criteria for evaluating the skills of a student pilot, as well as for defining the training path of the latter.

Pilot data $d_{pilot}$ are indicative of flight manoeuvres performed by the student pilot during the flight training mission. In particular, pilot data $d_{pilot}$ are digital data indicating the signals generated by the physical controls performed by the student pilot in the flight training mission; for exemplary purposes, a pilot datum $d_{pilot}$ is the signal generated by pressing a button in the cockpit 301 of the aircraft 300 in response to an external input (for example, an attack by an enemy actor).

The training element data $d_{asset}$ are data relative to the physical response of aircraft 300 upon a manoeuvre operated by the student pilot; for exemplary purposes, training element data $d_{asset}$ are data relative to the positions, attitude, speeds and/or accelerations of the aircraft 300 piloted by the student pilot during the flight training mission.

Figure 3:
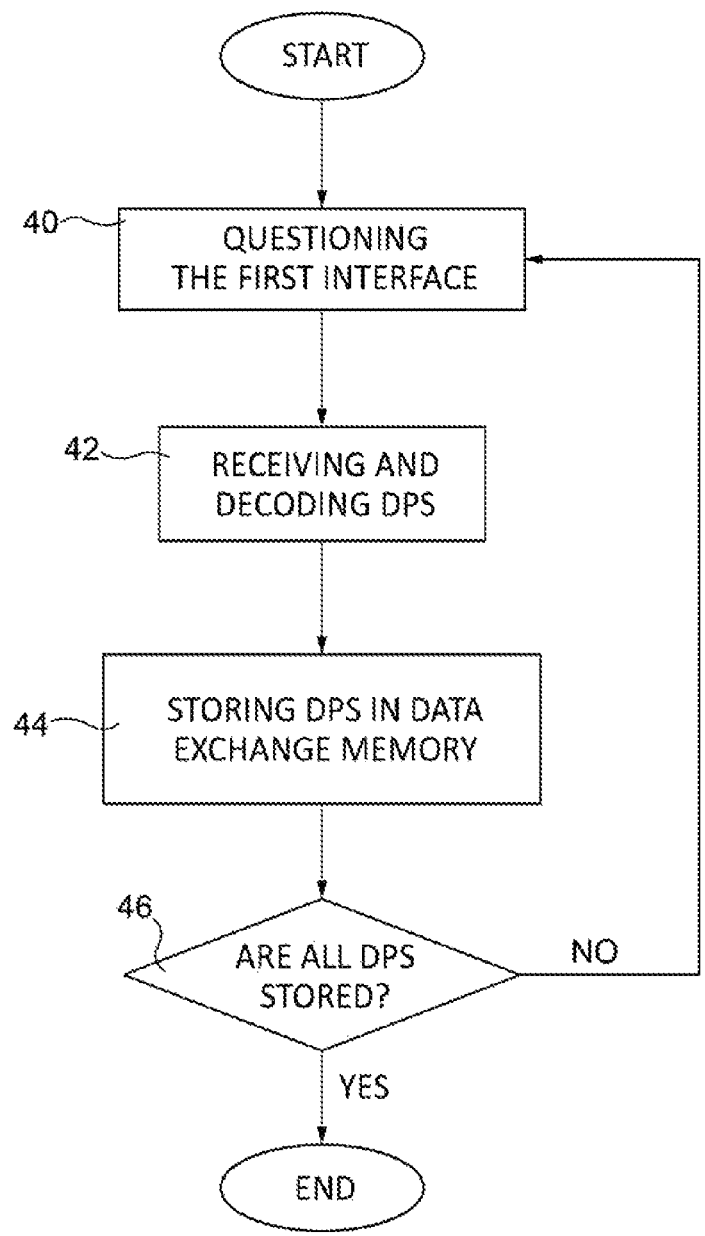
FIG. 3 is a block diagram of an initialization method of the evaluation system of FIG. 1B.

The evaluation system 10 is first initialized according to the initialization method schematically shown in FIG. 3 and described in detail hereinafter.

The external memory support 308 is firstly connected to the processor 302, as well as to the first interface 25 through dedicated system buses (not shown). The first interface 25 is thus questioned by the first operating module 30, such that the first processing unit 13 may have access to the external memory support 308 and, therefore, to configuration data $d_{config}$ through the first interface 25 (block 40); in particular, the first interface 25 is questioned by the master scheduling system 1 according to the operating frequency f.

Once the first interface 25 is questioned, block 42, the first operating module 30 receives configuration data $d_{config}$ and converts them into converted configuration data $d_{config}'$; thereby, even training data $d_{DP}$ are converted into converted training data $d_{DP}'$.

Thereafter, block 44, converted configuration data $d_{config}'$ (in particular, converted training data $d_{DP}'$) are transmitted to the data exchange memory 19, which stores them.

Subsequently, the first operating module 30 verifies that all the training data $d_{DP}$, from the external memory support 308, were received and stored as converted into the data exchange memory 19.

In case the first operating module 30 has not received all the required training data $d_{DP}$ for the flight training mission (i.e., the external memory support 308 contains training data $d_{DP}$ yet to be extracted), the master scheduling system 1 recalls again the task of the first operating module 30, such that operations described referring to blocks 40-44 are repeated; therefore, the first operating module 30 questions again the first interface 25, to receive, decode and store missing training data $d_{DP}$ (still stored in the memory support 308) according to the previously described modes.

In case the first operating module 30 has received all the required training data $d_{DP}$ for the flight training mission, the master scheduling system 1 determines that the initialization procedure of the evaluation system 10 is complete.

Figure 4:
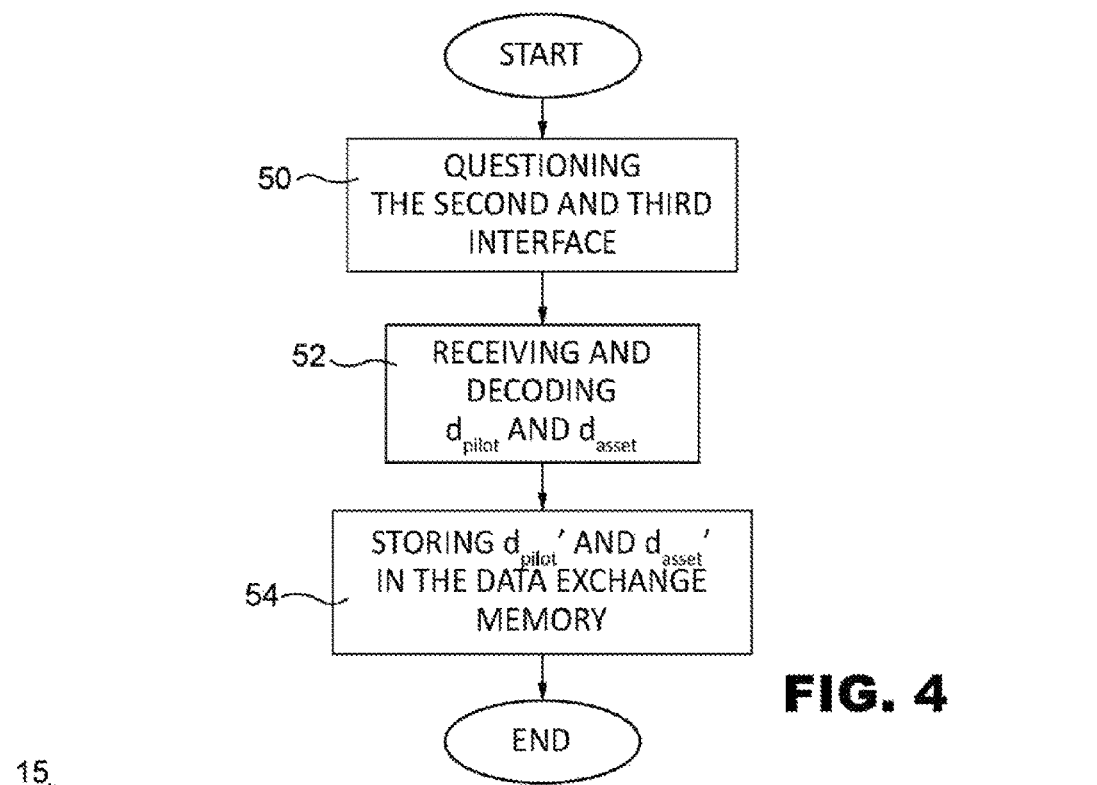
FIG. 4 is a block diagram of an operation method of the first processing unit of FIG. 2.

FIG. 4 shows an operation method of the first processing unit 13 during a step of the flight training mission; in particular and without any loss of generality, the method of FIG. 4 refers to a single iteration, performed after the initialization step described with reference to the block diagram of FIG. 3.

In greater detail, when the flight training mission starts (i.e. the student pilot performs actions in response to external inputs), the master scheduling system 1 recalls the tasks of the second and third operating module 32, 34, to question the second and, respectively, the third interface 27, 29 for receiving pilot data $d_{pilot}$ and, respectively, training element data $d_{asset}$ (block 50).

Once the second and third interfaces 27, 29 are questioned, block 52, the second and third operating module 32, 34 receive and process the pilot data $d_{pilot}$ and, respectively, the training element data $d_{asset}$, to generate converted pilot data $d_{pilot}'$ and, respectively, converted training element data $d_{asset}'$.

Subsequently, converted pilot data $d_{pilot}'$ and converted training element data $d_{asset}'$ are transmitted and stored in the data exchange memory 19 (block 54), to be employed in following processing steps by the second and third processing units 15, 17.

Operations described with reference to blocks 50-54 are periodically recalled by the master scheduling system 1 according to the operating frequency f. For example, in a first time instant $t_1$, which is a multiple of the operating frequency f, the operating modules 32, 34 question the respective interfaces 27, 29 to receive the pilot data $d_{pilot}$ and the training element data $d_{asset}$; subsequently, in a second time instant $t_2$, which follows the first time instant $t_1$ and which is a multiple of the operating frequency f, the operating modules 32, 34 process the data acquired at the first time instant $t_1$ and, at the same time, question again the respective interfaces 25, 27, 29 to receive further pilot data $d_{pilot}$ and further training element data $d_{asset}$.

Figure 5:
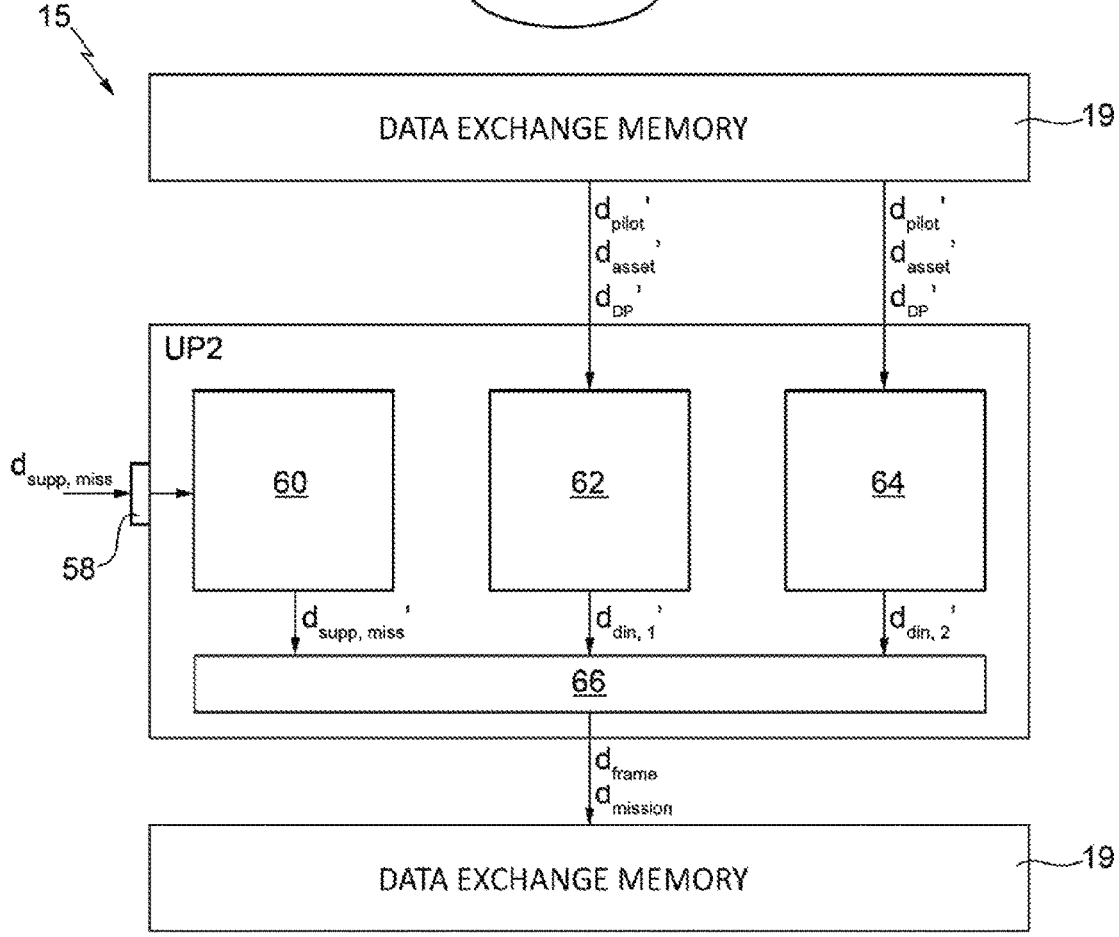
FIG. 5 schematically shows a first processing unit of the evaluation system of FIG. 1B.

FIG. 5 schematically shows the second processing unit 15, which comprises a receiving interface 58, coupled for instance through dedicated buses (not shown) with the external memory support 308; a receiving module 60, operatively coupled with the receiving interface 58; a first and second processing module 62, 64, operatively coupled with the data exchange memory 19; and a management module 66, operatively coupled with the operating modules 60, 62, 64.

The receiving interface 58 is configured to question and receive mission support data $d_{supp,miss}$ from the external memory support 308. Consequently, the receiving module 60 is configured to receive as an input mission support data $d_{supp,miss}$ by the receiving interface 58, as well as to process them to generate converted mission support data $d_{supp,miss}'$, having a format that can be used for the evaluation system 10.

In particular, for ease of description, the receiving module 60 is considered to receive mission support data $d_{supp,miss}$, received by the receiving interface 58, at the same time instant as the aforesaid data are received by the receiving interface 58 itself; in other words, it is considered that there are no delays in the transmission of mission support data $d_{supp,miss}$ between the receiving interface 58 and the receiving module 60.

As previously anticipated, mission support data $d_{supp,miss}$ comprise boundary condition data $d_{bc}$, and actor type data $d_{att,typ}$ and actor data $d_{att}$, the latter comprising in turn operability maths data $d_{math}$, relative to the behaviour, controlled on the basis of predefined algorithms, of the actors present in the flight training mission. In particular, operability maths data $d_{math}$ relate to actors managed by the evaluation system 10 according to predefined maths models; an example of such actors are aircrafts interacting with the training element, in particular the aircraft 300, and having autonomous behaviours that are independent of an input control by a user.

The first and the second processing modules 62, 64 are configured to receive converted pilot data $d_{pilot}'$ and converted training element data $d_{asset}'$, as well as converted training data $d_{DP}'$. Therefore, the first and the second processing modules 62, 64 receive information relative to the behaviour of the pilot and aircraft employed in the flight training mission. Furthermore, based on the aforesaid converted pilot data $d_{pilot}'$ and the aforesaid converted training element data $d_{asset}'$, the first and the second processing modules 62, 64 are configured to stimulate the one or more sensors 304, and respectively, the one or more actuators 306 of the aircraft 300 to obtain information relative to the space condition of the aircraft 300.

In the embodiments of the present invention wherein the flight training mission is of the simulation type, the first and the second processing modules 62, 64 allow to obtain information from sensors and, respectively, actuators representing the space condition of the aircraft in case it was real.

Generally, the first and the second processing modules 62, 64 allow to obtain dynamic information on the performance of the aircraft 300, i.e. they generate first, and respectively, second dynamic data $d_{din,1}$, $d_{din,2}$.

The management module 66 is configured to receive and process the first and second dynamic data $d_{din,1}$, $d_{din,2}$ and converted mission support data $d_{supp,miss}$' to generate training mission data $d_{mission}$ and graphic processing data $d_{frame}$. In greater detail, the training mission data $d_{mission}$ are data relative to the operations performed by each actor in the flight training mission fulfilling the boundary conditions defined by converted mission support data $d_{supp,miss}$' (in particular, by converted boundary condition data $d_{bc}$', processed by the receiving module 60 from boundary condition data $d_{bc}$). Graphic processing data $d_{frame}$ are graphic data relative to the flight training mission performed by the student pilot and allow, as better described hereinafter, to generate a virtual graphic representation, which can be viewed on the screen 303 of the aircraft 300, of the external environment, of the actors and of the aircraft 300 piloted by the student pilot.

Figure 6:
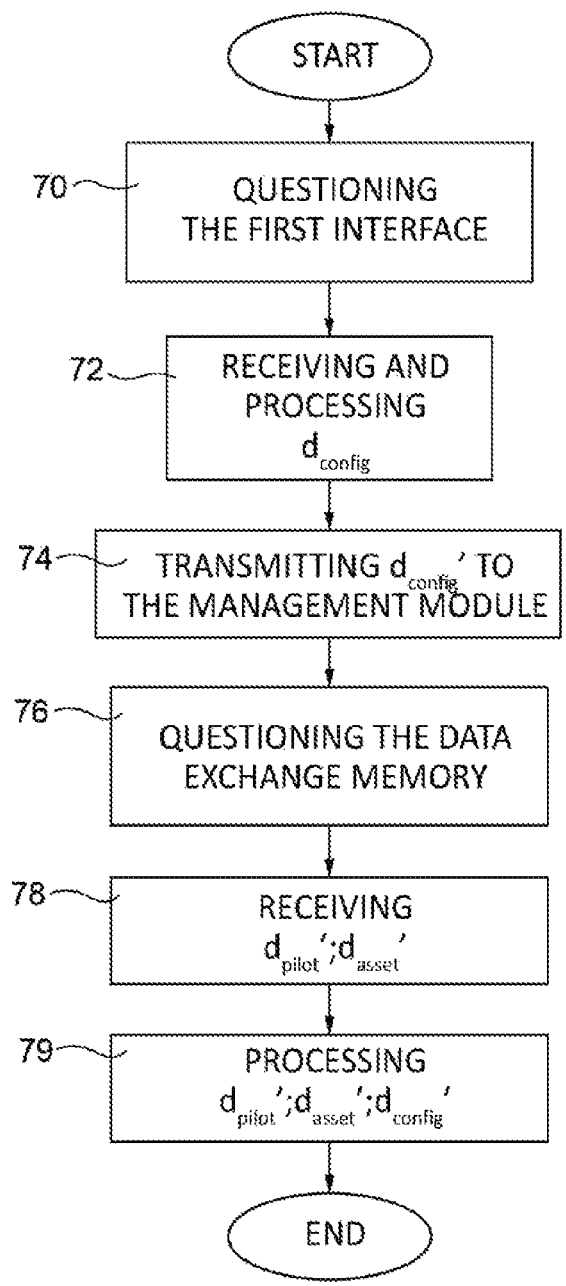
FIG. 6 is a block diagram of an operation method of the second processing unit of FIG. 5.

In use, the second processing unit 15 operates according to the modes described with reference to the block diagram of FIG. 6. In particular, for ease of description and without any loss of generality, reference will be made to a single repetition of the operation method of the second processing unit 15 hereinafter.

In the first place, the receiving interface 58 is questioned by the receiving module 60, such that the second processing unit 15 may have access through the receiving interface 58 to the external memory support 308, and thus, to the training mission support data $d_{supp,miss}$ (block 70).

Once the receiving interface is questioned 58, block 72, the receiving module 60 receives and, later, processes training mission support data $d_{supp,miss}$ to generate converted training mission support data $d_{supp,miss}$' which are therefore transmitted to the management module 66 (block 74).

Subsequently, the master scheduling system 1 recalls the tasks of the first and second processing module 62, 64 such that they question the data exchange memory 19 to receive converted pilot data $d_{pilot}$' and converted training element data $d_{asset}$' (block 76).

Once the data exchange memory 19 is questioned, block 78, the converted pilot data $d_{pilot}$' and the converted training element data $d_{asset}$' are received by the first and second processing module 62, 64, which, on h basis of the converted pilot data $d_{pilot}$' and converted training element data $d_{asset}$', stimulate the one or more sensors 304, and respectively, the one or more actuators 306 to generate the first and second dynamic data $d_{din,1}$, $d_{din,2}$ which are therefore transmitted to the management module 66.

The management module 66 thus processes the converted mission support data $d_{supp,miss}$' and the first and second dynamic data $d_{din,1}$, $d_{din,2}$ to obtain the training mission data $d_{mission}$ and the graphic processing data $d_{frame}$, which are transmitted and stored in the data exchange memory 19.

The operations described with reference to blocks 76-79 are periodically managed by the master scheduling system 1 according to the frequency f. For example, in a third time instant $t_3$, multiple of the operating frequency f and, for example, subsequent to the second time instant $t_2$, the processing modules 62, 64 question the data exchange memory 19 to receive the converted pilot data $d_{pilot}$' and the training element data $d_{asset}$'; subsequently, in a fourth time instant $t_4$, subsequent to the third time instant $t_3$ and multiple of the operating frequency f, processing modules 62, 64 process converted pilot data $d_{pilot}$' and training element data $d_{asset}$' to obtain dynamic data $d_{din,1}$, $d_{din,2}$ and to transmit them to the management module 66. In the same fourth time instant $t_4$, the processing modules 62, 64 question again the data exchange memory 19 to receive other converted pilot data $d_{pilot}$' and other training element data $d_{asset}$'. Therefore, in a fifth time instant $t_5$, subsequent to the fourth time instant $t_4$ and multiple of the operating frequency f, the managing module 66 processes dynamic data $d_{din,1}$, $d_{din,2}$ to generate training mission data $d_{mission}$ and graphic processing data $d_{frame}$; in the same fifth time instant $t_5$, the processing modules 62, 64 process the other converted pilot data $d_{pilot}$' and the other training element data $d_{asset}$' to generate and transmit to the management module 66 other dynamic data $d_{din,1}$, $d_{din,2}$. In addition, the processing modules 62, 64 question, at the fifth time instant $t_5$, the data exchange memory to receive further converted pilot data $d_{pilot}$' and further training element data $d_{asset}$'.

Figure 7:
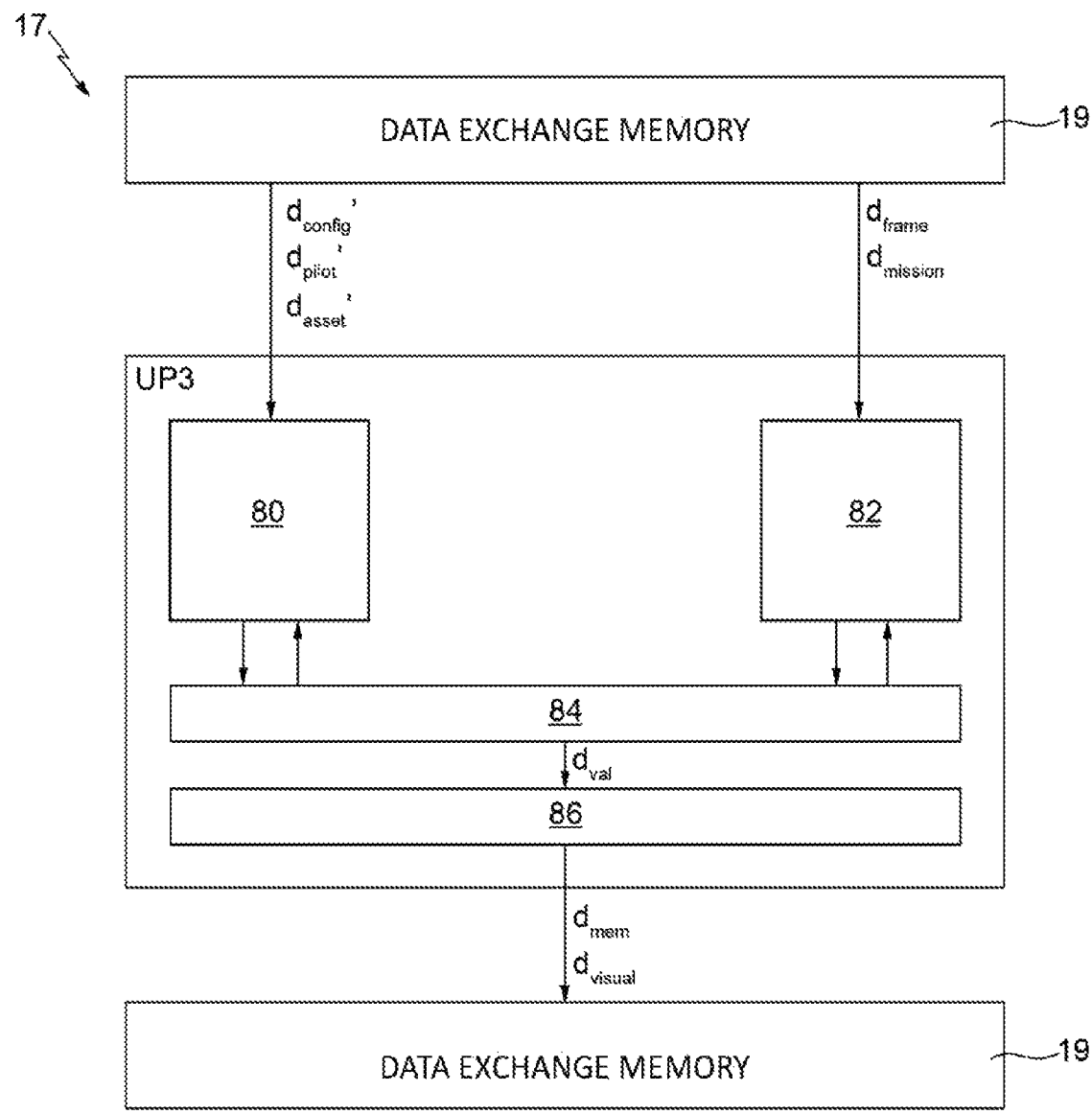
FIG. 7 schematically shows a third processing unit of the evaluation system of FIG. 1B.

FIG. 7 schematically shows the third processing unit 17, which comprises a first and a second data acquisition module 80, 82, operatively coupled with the data exchange memory 19; an evaluation module 84, operatively coupled with the first and the second data acquisition module 80, 82; and an evaluation writing module 86, operatively coupled with the evaluation module 84 and the data exchange memory 19.

In particular, the first data acquisition module 80 is configured to receive converted pilot data $d_{pilot}$' and converted training element data $d_{asset}$', as well as converted training data $d_{DP}$', stored in the data exchange memory 19.

The second data acquisition module 82 is configured to receive training mission data $d_{mission}$ and graphic processing data $d_{frame}$ generated by the second processing unit 15 and stored in the data exchange memory 19.

The evaluation module 84 is configured to compare the training mission data $d_{mission}$, converted pilot data $d_{pilot}$' and converted training element data $d_{asset}$' with respect to converted training data $d_{DP}$' so as to express an evaluation on the actions of the student pilot in the flight training mission.

In order to perform the aforesaid comparison, the evaluation module 84 is at first configured to verify that the training mission data $d_{mission}$ fulfil the entry condition, i.e. fulfil the forecasts provided by the converted training data $d_{DP}$' within a predetermined confidence range; for example, such condition is verified if the aircraft 300 is at a height within a confidence range relative to the reference height at which the aircraft 300 must be in order for the entry condition of the corresponding converted training datum $d_{DP}$' to be fulfilled.

After verifying the validity of the entry condition, the evaluation module 84 is configured to verify that converted pilot data $d_{pilot}$' and training element data $d_{asset}$' fulfil the thresholds set by the converted training data $d_{DP}$'. In other words, the evaluation module 84 is configured to verify that the operations performed by the student pilot in the flight training mission fulfil the objectives set by his own training programme.

Furthermore, after performing the provided operation in a way at all similar to what described referring to the entry condition, the evaluation module 84 is configured to verify that the training mission data $d_{mission}$ fulfil the exit condition, i.e. fulfil the forecasts provided by training data $d_{DP}$' within a further preset confidence range.

After fulfilling the exit condition, the evaluation system 10 may proceed to evaluate the actions of the student pilot considering the other converted training data $d_{DP}$'; in alternative, the evaluation system 10 determines the conclusion of the flight training mission in case all the converted training data $d_{DP}$' have been validated (i.e. all the provided comparisons have been performed), thus concluding the evaluation of the student pilot's actions.

The evaluation module 84 is further configured to verify that the graphic processing data $d_{frame}$ fulfil the thresholds set by the converted boundary condition data $d_{bc}$'.

The evaluation module 84 is further configured to generate evaluation data $d_{val}$, indicating the evaluation of the student pilot's actions obtained by comparing converted pilot data $d_{pilot}$' and converted training element data $d_{asset}$' with the training data $d_{DP}$'; furthermore, the evaluation data $d_{val}$ are transmitted by the evaluation module 84 to the evaluation writing module 86.

The evaluation writing module 86 is configured to receive the evaluation data $d_{val}$ and to generate, based on evaluation data $d_{val}$, visualization data $d_{visual}$ and memorization data $d_{mem}$, which are transmitted to the data exchange memory 19 to be made available to the graphic processing unit 21, and respectively, to the memory unit 23. In particular, visualization data $d_{visual}$ are generated from graphic processing data $d_{frame}$.

In greater detail, the graphic processing unit 21 is configured to receive the visualization data $d_{visual}$ and process them so as to submit to the student pilot a graphic representation of the operating environment where the flight training mission takes place, as well as of the present actors and of the evaluation of the actions of the student pilot; for example the graphic processing unit 21 shows a pop up message, indicating "OK" in case the evaluation is positive and "KO" in case the evaluation is negative.

In addition, the memory unit 23 is configured to receive and store memorization data $d_{mem}$, such that, every time the master scheduling system 1 recalls the tasks of the third processing unit 17 according to the operating frequency f, the evaluation writing module 86 generates further memorization data $d_{mem}$ which, stored in the memory unit 23, form a data record relative to the student pilot's learning progress.

Figure 8:
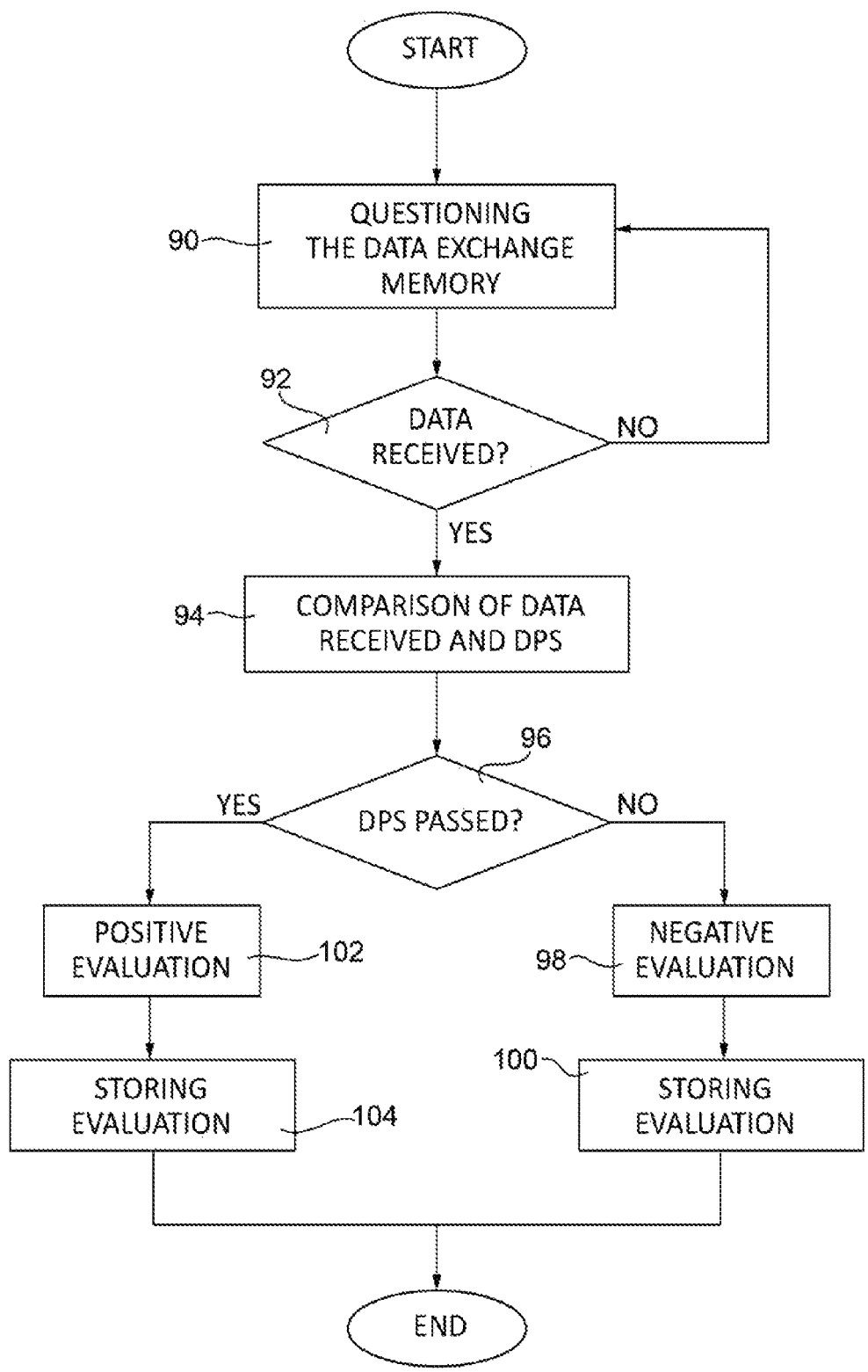
FIG. 8 is a block diagram of the operation of the third processing unit of FIG. 7.

In use, the third processing unit 17, in particular the evaluation module 84, operates according to an operation method schematically shown in FIG. 8.

In the first place, block 90, the first and the second data acquisition modules 80, 82 question the data exchange memory 19 such to receive converted training data $d_{DP}$', converted pilot data $d_{pilot}$', converted training element data $d_{asset}$' and, respectively, graphic processing data $d_{frame}$, and training mission data $d_{mission}$.

Once the data exchange memory 19 is questioned, decision block 92, the third processing unit 17 verifies that data requested to the data exchange memory 19 have been received by the first and second data acquisition modules 80, 82. In other words, the third processing unit 17 verifies that the converted training data $d_{DP}$', the converted pilot data $d_{pilot}$', the converted training element data $d_{asset}$', the graphic processing data $d_{frame}$, and the training mission data $d_{mission}$ received allow the evaluation module 84 to validate the entry condition, and subsequently, to perform the comparison to generate evaluation data $d_{val}$.

In case the converted training data $d_{DP}$', the converted pilot data $d_{pilot}$', the converted training element data $d_{asset}$', the graphic processing data $d_{frame}$, and the training mission data $d_{mission}$ received are not sufficient for validating the entry condition, the step described referring to block 90 is repeated until the above mentioned converted training data $d_{DP}$', converted pilot data $d_{pilot}$', converted training element data $d_{asset}$', graphic processing data $d_{frame}$, and training mission data $d_{mission}$ are all received.

In case the converted training data $d_{DP}$', the converted pilot data $d_{pilot}$', the converted training element data $d_{asset}$', the graphic processing data $d_{frame}$, and the training mission data $d_{mission}$ received are sufficient for validating the entry condition, the evaluation module 84 determines that the entry condition is fulfilled and that it is thus possible to proceed to compare the converted pilot data $d_{pilot}$' and the converted training element data $d_{asset}$' and the converted training data $d_{DP}$' (block 94).

Subsequently, decision block 96, the evaluation module 84 determines if the converted pilot data $d_{pilot}$' and the converted training element data $d_{asset}$' are equal or greater than the thresholds defined by the relative converted training data $d_{DP}$'; in other words, the evaluation module 84 verifies that the student pilot's actions enable the aircraft 300 to be for instance at the space position (for example, in terms of altitude, latitude and/or longitude) provided by the thresholds defined by the converted training data $d_{DP}$'.

In case the converted pilot data $d_{pilot}$' and the converted training element data $d_{asset}$' are lower than the thresholds defined by converted training data $d_{DP}$', the evaluation module 84 determines that the student pilot has not reached the required learning requirements for the flight training mission he was submitted to; therefore, the evaluation module 84 issues evaluation data $d_{val}$ such that the evaluation writing module 86 receives them and generates visualization data $d_{visual}$ and memorization data $d_{mem}$ indicating failure to reach the provided requirements (blocks 98, 100).

In case the converted pilot data $d_{pilot}$' and the converted training element data $d_{asset}$' are greater than or equal to the converted training data $d_{DP}$', the evaluation module 84 issues evaluation data $d_{val}$ such that the evaluation writing module 86 receives them and generates visualization data $d_{visual}$ and memorization data $d_{mem}$ indicating success in reaching the provided requirements (blocks 102, 104).

The operation described with reference to blocks 90-104 are periodically recalled by the master scheduling system 1 according to the operating frequency f.

For example in a sixth time instant $t_6$, multiple of the operating frequency f and, for example subsequent to the fifth time instant $t_5$, the data acquisition modules 80, 82 question the data exchange memory 19 to receive the aforementioned converted training data $d_{DP}$', converted pilot data $d_{pilot}$', converted training element data $d_{asset}$', graphic processing data $d_{frame}$, and training mission data $d_{mission}$, as well as to transmit them to the evaluation module 84. Therefore, in a seventh time instant $t_7$, subsequent to the sixth time instant $t_6$ and multiple of the operating frequency f, the evaluation module 84 processes the aforementioned converted training data $d_{DP}$', the converted pilot data $d_{pilot}$', the converted training element data $d_{asset}$', the graphic processing data $d_{frame}$, and the training mission data $d_{mission}$, to generate the evaluation data $d_{val}$; in the same seventh time instant $t_7$, data acquisition modules 80, 82 question again the data exchange memory 19 to obtain other converted training data $d_{DP}$', other converted pilot data $d_{pilot}$', other converted training element data $d_{asset}$', other graphic processing data $d_{frame}$, and other training mission data $d_{mission}$.

Subsequently, in an eighth time instant $t_8$, subsequent to the seventh time instant $t_7$ and multiple of the operating frequency f, the evaluation writing module 86 receives evaluation data $d_{val}$ and processes them to generate memorization data $d_{mem}$ and visualization data $d_{visual}$; in the same eighth time instant $t_8$, the evaluation module 84 processes the other converted training data $d_{DP}'$, the other converted pilot data $d_{pilot}'$, other converted training element data $d_{asset}'$, other graphic processing data $d_{frame}$, and other training mission data $d_{mission}$ to obtain other evaluation data $d_{val}$. Furthermore, in the same eighth time instant $t_8$, the data acquisition modules 80, 82 question again the data exchange memory 19 to receive further converted training data $d_{DP}'$, further converted pilot data $d_{pilot}'$, further converted training element data $d_{asset}'$, further graphic processing data $d_{frame}$, and further training mission data $d_{mission}$.

Figure 9:
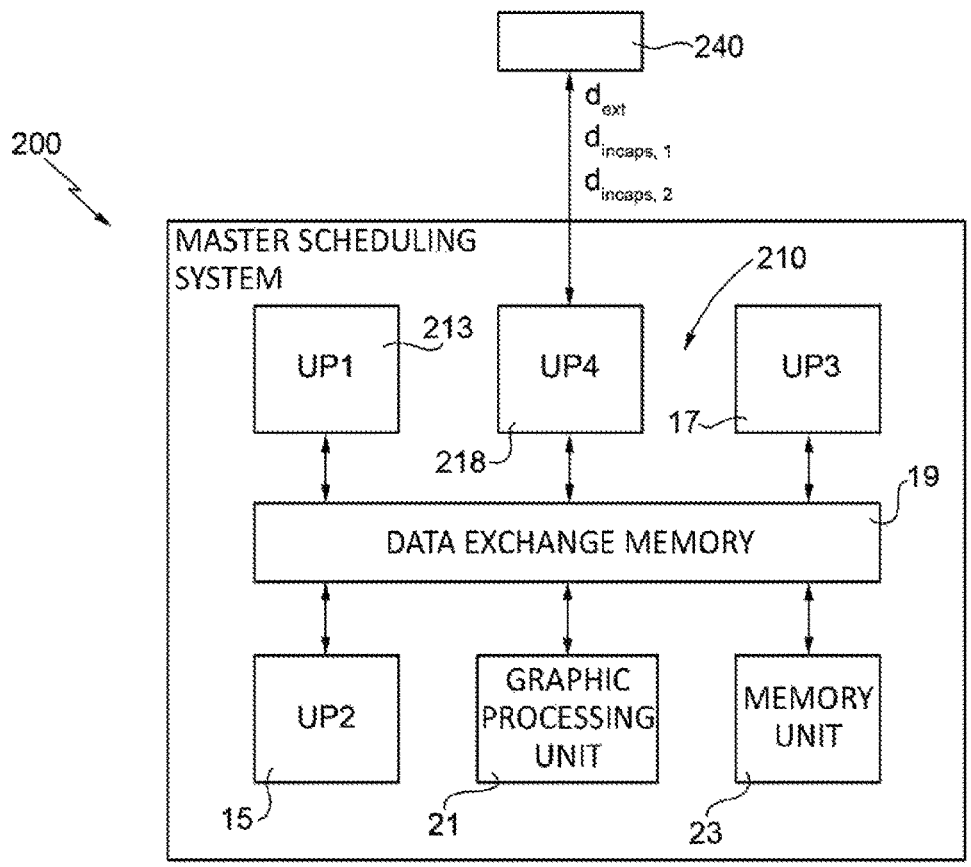
FIG. 9 schematically shows a master scheduling system comprising the present evaluation system according to another embodiment.

FIG. 9 shows the present master scheduling system according to another embodiment. In particular, FIG. 9 shows a master scheduling system 200 comprising an evaluation system 210, having a general structure similar to the master scheduling system 1 and, respectively, the evaluation system 10 of FIG. 1B; therefore, parts that are similar to those shown in FIG. 1B are indicated in FIG. 9 with the same reference numbers and will not be further described.

In addition, the evaluation system 210 comprises a first processing unit 213 having a general structure that is similar to the first processing unit 13 of FIG. 1B; therefore parts that are similar to those shown in FIG. 1B are indicated in FIG. 9 with the same reference numbers.

In particular, the evaluation system 210 comprises a fourth processing unit 218, connected to the processing units 213, 15, 17 through the data exchange memory 19; furthermore, the fourth processing unit 218 is operatively coupled to an external system (for example, a ground station) through a transmitting system 240, coupled to the external system for instance by WI-Fi connection or Ethernet cable.

Figure 10:
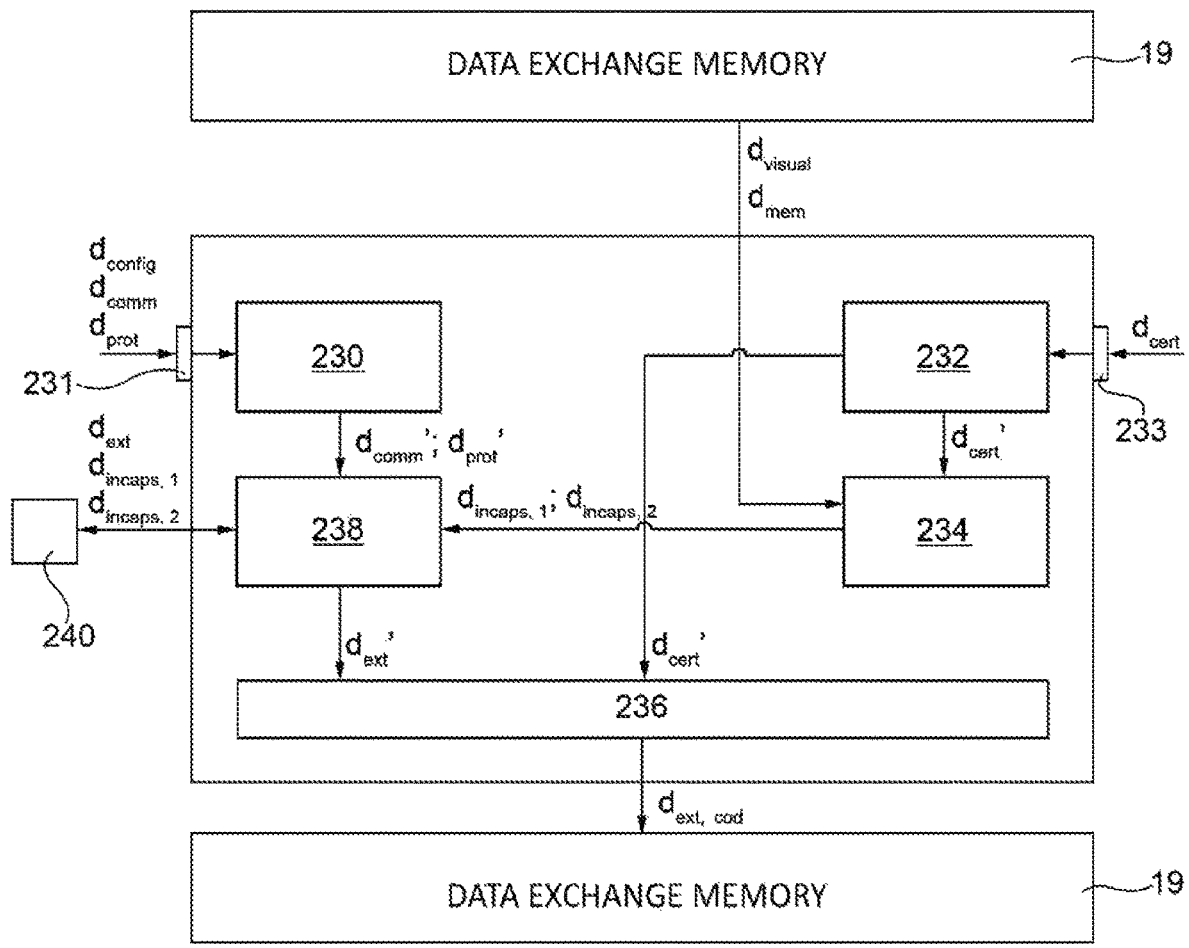
FIG. 10 schematically shows a fourth processing unit of the evaluation system of FIG. 9.

With reference to FIG. 10, the fourth processing unit 218 comprises a configuration module 230 and encryption module 232, configured to receive configuration data $d_{config}$ through a configuration interface 231 and, respectively, an encryption interface 233, the latter ones operatively coupled to the external memory support 308 by means for example of dedicated buses (not shown); an encapsulation module 234, operatively coupled to the data exchange memory 19 and configured to compress/decompress data transmitted/received to/from the transmitting system 240, such as to reduce the baud rate between the fourth processing unit 218 and the transmitting system 240; a decoding module 236, operatively coupled to the encryption module 232; and a remote data sending and receiving module 238, operatively coupled to the configuration module 230, the encapsulation module 234 and the decoding module 236, as well as to the transmitting system 240.

In greater detail, the transmitting system 240 is configured to transmit external data $d_{ext}$ from the external system which the transmitting system 240 is coupled to; the aforesaid external data $d_{ext}$ are, for example, further training data $d_{DP}''$, these latter configured to replace or add to converted training data $d_{DP}'$. In other words, the aforesaid transmitting system 240 allows, for example, to update in real time the objectives that the student pilot must reach to obtain a positive evaluation of the flight training mission.

In further embodiments, the transmitting system 240 receives, as external data $d_{ext}$, data relative to the behaviour of further actors, for instance connected by a Wi-Fi connection, also operating in the flight training mission performed by the student pilot. For example, the external data $d_{ext}$ are relative to further student pilots and/or flight instructors taking part in the flight training mission. In that case, we deal with a shared flight training mission, in that data relative to further actors are shared by online connection with the evaluation system 210.

In addition to certificate data $d_{cert}$ and set-up data $d_{set-up}$, configuration data $d_{config}$ comprise communication data $d_{comm}$, relative to the type and mode of transmitting data with the transmitting system 240 (e.g. online) and protocol data $d_{prot}$, relative to the types of transmission protocols used by the fourth processing unit 218 to communicate with the transmitting system 240.

The configuration module 230 is configured to receive and process the communication data $d_{comm}$ and the protocol data $d_{prot}$ such to generate converted communication data $d_{comm}'$ and, respectively, converted protocol data $d_{prot}'$, having a format that can be used for the evaluation system 210; furthermore, the configuration module 230 is configured to transmit the converted communication data $d_{comm}'$ and the converted protocol data $d_{prot}'$ to the remote data sending and receiving module 238.

The encryption module 232 is configured to receive configuration data $d_{config}$, in particular certificate data $d_{cert}$, as well as process the latter such to generate converted certificate data $d_{cert}'$ having a format that can be used for the evaluation system 210; furthermore, the encryption module 232 is configured to transmit converted certificate data $d_{cert}'$ both to the encapsulation module 234 and to the decoding module 236.

The encapsulation module 234 is configured to receive the visualization data $d_{visual}$ and memorization data $d_{mem}$ generated by the third processing unit 17, as well as the converted certificate data $d_{cert}'$; the encapsulation module 234 is further configured to process the visualization data $d_{visual}$ and the memorization data $d_{mem}$ to encapsulate them according to encoding and decoding rules imposed by the converted certificate data $d_{cert}'$, thus generating first and second encapsulated data $d_{incaps,1}$, $d_{incaps,2}$. Furthermore, the encapsulation module 234 is configured to transmit the aforesaid encapsulated data $d_{incaps,1}$, $d_{incaps,2}$ to the remote data sending and receiving module 238.

The remote data sending and receiving module 238 is configured to receive the aforesaid encapsulated data $d_{incaps,1}$, $d_{incaps,2}$ generated by the encapsulated module 234, as well as the converted communication data $d_{comm}'$ and the converted protocol data $d_{prot}'$ generated by the communication module 230; furthermore, the remote data sending and receiving module 238 is configured to transmit encapsulated data $d_{incaps,1}$, $d_{incaps,2}$ to the transmitting system 240.

Furthermore, the remote data sending and receiving module 238 is configured to receive and process the external data $d_{ext}$ from the transmitting system 240 such to generate converted external data $d_{ext}'$ having a format that can be used for the evaluation system 210. The remote data sending and receiving module 238 is further configured to transmit converted external data $d_{ext}'$ to the decoding module 236, which is configured to decode them based on information supplied by the converted certificate data $d_{cert}'$. Thereby, the decoding module 236 generates decoded external data $d_{ext,cod}$, which are transmitted to the encryption module 232 and to the data exchange memory 19, which makes them available to the first processing unit 213.

Furthermore, in another embodiment, the remote data sending and receiving module 238 is configured to transmit converted communication data $d_{comm}'$ and converted protocol data $d_{prot}'$ to an inlet/outlet peripheral device (I/O not shown); in particular, the inlet/outlet peripheral device is configured to connect evaluation systems of different operators through an Ethernet connection, rather than a Wireless connection. Such inlet/outlet peripheral device is used, for example, when the aircrafts connected to the evaluation system 210 are simulated by a simulator.

In use, the fourth processing unit 218 operates according to one first and one second mode, depending on whether the transmitting system 240 transmits the aforementioned external data $d_{ext}$ or not.

In particular, in the first mode, the encapsulation module 234 questions the data exchange memory 19 to receive the visualization data $d_{visual}$ and memorization data $d_{mem}$; in particular, the encapsulation module 234 encapsulates visualization data $d_{visual}$ and memorization data $d_{mem}$ based on converted certificate data $d_{cert}'$ to generate encapsulated data $d_{incaps,1}$, $d_{incaps,2}$, which are then transmitted to the transmitting system 240.

In the second operating mode, the transmitting system 240 sends external data $d_{ext}$ to the remote data sending and receiving module 238, which processes them to obtain converted external data $d_{ext}'$. Subsequently the data sending and receiving module 238 transmits converted external data $d_{ext}'$ to the decoding module 236, which encodes converted external data $d_{ext}'$ based on converted certificate data $d_{cert}'$, generating the encoded external data $d_{ext,cod}$. Then, the decoding module 236 transmits the encoded external data $d_{ext,cod}$ to the data exchange memory 19.

Figure 11:
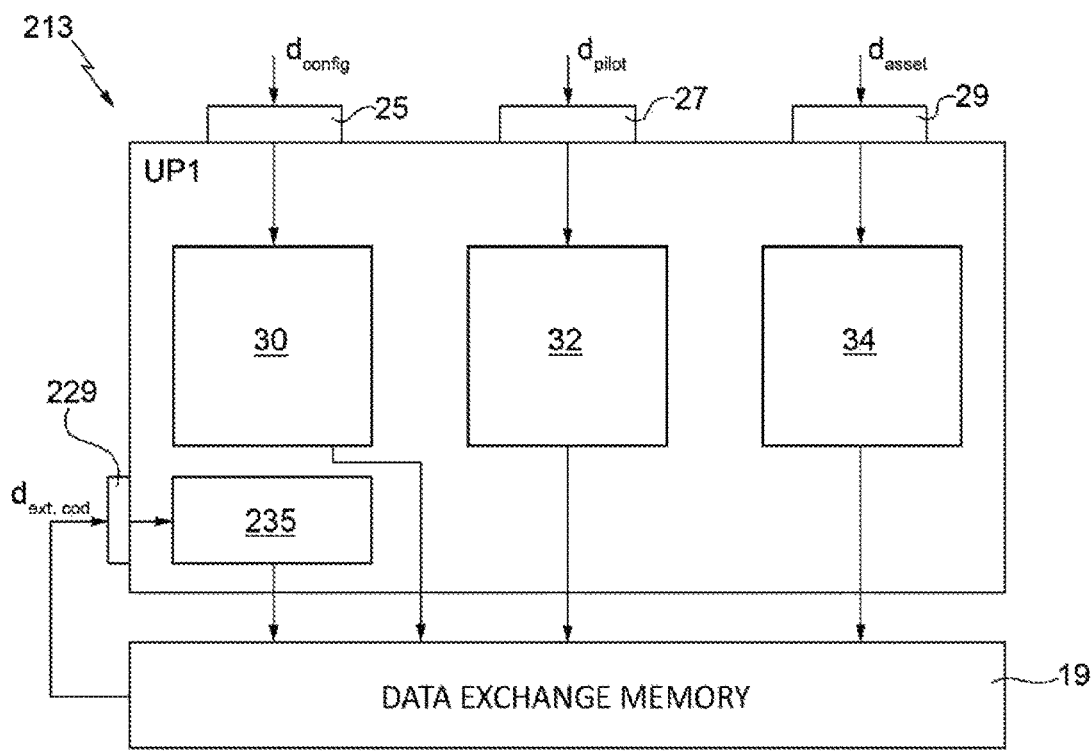
FIG. 11 schematically shows a first processing unit of the evaluation system of FIG. 9.

With reference to FIG. 11, the first processing unit 213 comprises one fourth interface 229, coupled with the data exchange memory 19 and configured to receive the encoded external data $d_{ext,cod}$ generated by the fourth processing data 218.

The first processing unit 213 further comprises a remote receiving module 235, operatively coupled with the fourth interface 229 and configured to receive and transmit the encoded external data $d_{ext,cod}$ to the data exchange memory 19, which stores them and makes them available to the third processing unit 17 for processing the evaluation of the student pilot's actions in the flight training mission.

In addition, the receiving module 60 of the second processing unit 15 of the evaluation system 210 is configured to receive shared attitude data $d_{asset,share}$, belonging to mission support data $d_{supp,miss}$ and relative to the characteristics of the training attitudes of the actors taking part in the shared flight training mission. The shared attitude data $d_{asset,share}$ are processed by the receiving module 60, generating converted shared attitude data $d_{asset,share}'$, which are then transmitted to the management module 66.

Thereby, the evaluation system 210 also comprises data relative to the aircrafts and transmitted through the transmitting system 240 to the evaluation system 210 operating in the flight training mission.

The present system and the method thereof have several advantages.

In particular, the present evaluation system 10, 210 allows to generate data relative to the evaluation of the actions of a student pilot (in particular, visualization data $d_{visual}$ and memorization data $d_{mem}$) which are objective and obtained in real time. In detail, the master scheduling system 1 periodically recalls (in particular, with the operating frequency f) the tasks of the processing units 13, 213, 15, 17, 218, which are then configured to periodically perform the operations previously described. Consequently, the comparison for the evaluation of the student pilot's actions (see in particular block 94 of FIG. 8) occurs periodically, i.e. at time instants that are subsequent between each other and ruled by the same operating frequency f.

Furthermore, the present system allows to provide a graphic representation of the environment wherein the flight training mission takes place, of the path carried out by the aircraft 300, as well as the evaluation of the actions of the student pilot on the screen 303 present in the cockpit of the aircraft 300; in fact, thanks to the processing of the visualization data $d_{visual}$ by the graphic processing unit 21, it is possible to immediately view the result of the exercise carried out by the student pilot and the area where the flight training mission takes place. In case of a simulation, such virtual graphic representation is shown on the screen of the processor performing the simulation of the flight training mission.

Finally it is clear that changes and variations can be made to what herein described and illustrated without departing from the protection scope of the present invention, as defined in the attached claims.

For example, the present evaluation system and the method thereof may be applied also to other types of aircraft, such as helicopters.

In addition, the present evaluation system and the method thereof may be adapted in such a way as to be used also for further vehicles, such as boats (e.g., military ships) and ground vehicles (e.g., tanks).

The invention claimed is:

1. An electronic evaluation system to evaluate a results of a training session occurring on a training apparatus, the electronic evaluation system comprising:
   a plurality of respective processors, each configured by executing instructions;
   at least one sensor;
   at least one actuator; and
   memory resources configured to receive, store, and respectively provide data for the plurality respective of processors;
   wherein the electronic evaluation system is configured for initialization by performing steps including to:
      prompt the memory resources for mission support data representing thresholds associated with the training session, including at least one boundary condition of an aircraft associated with at least one of altitude, speed, latitude, and longitude during a time period of the training session;
      prompt the memory resources for pilot data representing physical interactions with the training apparatus, including training maneuvers performed during the training session;
      prompt the memory resources for training element data representing responses of the training apparatus to the physical interactions performed during the training session;
      receive, from the memory resources in response to the respective prompts, the training element data, the pilot data, and the training element data, wherein each of the training element data, the pilot data, and the training element data is received in a respective data format;
      process the received the mission support data, the pilot data, and the training element data to convert the mission support data, the pilot data, and the training data to respective formats to generate processed mission support data, processed pilot data, and processed training element data;
      transmit to the memory resources the processed mission support data, the processed pilot data, and the processed training element data for at least temporary storage;
   wherein the electronic evaluation system is further configured during the training session to:

prompt the memory resources for the processed mission support data;

receive, in response to the prompt, the processed mission support data;

subsequently prompt the memory resources for the processed pilot data and the processed training element data;

receive, in response to the prompt, the processed pilot data and the processed training element data;

stimulate, in response to receiving the processed pilot data and the processed training element data, the at least one sensor and the at least one actuator;

receive, in response to stimulating the at least one sensor and the at least one actuator, information representing a space condition of the aircraft;

generate, using the information representing the space condition of the aircraft, dynamic data;

generate, using at least the dynamic data, the processed pilot data, and the processed training element data, training mission data representing operations performed during the training session and graphic processing data providing a graphic representation of an operating environment of the training apparatus during the training session;

the electronic evaluation system further configured to:
receive the graphic processing data and display a graphic representation of an operating environment of the training apparatus during the training session, including the operations performed during the training session with respect to the boundary conditions and the training apparatus.

2. The electronic evaluation system according to claim 1, wherein the electronic evaluation system is further configured to:

evaluate the training mission data with respect to training objectives of the training session to determine that an entry condition indicative of an action request is fulfilled;

process and evaluate the configured pilot data and the configured training element data with respect to the training objectives of the training session that an entry condition is fulfilled and to determine an evaluation datum;

evaluate the training mission data with respect to the training objectives of the training session to determine whether an exit condition indicative of a request to conclude an action is fulfilled, after evaluating the configured pilot data and the configured training element data with respect to the training objectives of the training session;

process the evaluation datum to determine memorization data and visualization data, the memorization data being representative of an evaluation of the operation during the training session; and transmit the memorization data and the visualization data to the memory resources.

3. The electronic evaluation system according to claim 1, wherein the electronic evaluation system is further configured to:

receive and process configuration data representing a learning path associated with the training session;

determine encryption data representing information that allow encoding and decoding data received and/or determined by the processor; and receive and process visualization data and the graphic processing data and the encryption data to determine encapsulated data.

4. The electronic evaluation system according to claim 3, wherein the electronic evaluation system is further configured to:

receive and process external data from an external system coupled to the processor and representing updates of training objectives required in the training session;

determine coded external data ($d_{ext,cod}$) on the basis of the external data; and store the coded external data in the memory resources.

5. The electronic evaluation system according to claim 1, wherein the electronic evaluation system is further configured to:

prompt the memory resources for actor data representing at least one other aircraft associated with the training session;

receive, from the memory resources in response to the prompt, the actor data;

process the received actor data to convert the actor data to a respective format to generate processed actor data, wherein the training mission data are further generated using the processed actor data.

6. The electronic evaluation system according to claim 1, wherein the electronic evaluation system further comprises a plurality of respective interfaces, each interface respectively associated with one of the mission support data, the pilot data, and the training element data.

7. The electronic evaluation system according to claim 6, wherein the electronic evaluation system further comprises a plurality of operating modules, each of the operating modules respectively associated with the plurality of respective interfaces.

8. The electronic evaluation system according to claim 1, wherein the electronic evaluation system further comprises a master scheduling system.

9. The electronic evaluation system according to claim 1, wherein the prompting the memory resources is by the master scheduling system.

10. The electronic evaluation system according to claim 1, wherein at least one of the plurality of processors compares the dynamic data to at least one of the thresholds.

* * * * *